(12) United States Patent
Duron et al.

(10) Patent No.: US 10,061,952 B2
(45) Date of Patent: Aug. 28, 2018

(54) ARRANGEMENT FOR, AND METHOD OF, DETECTING PASSAGE OF OBJECTS ASSOCIATED WITH RADIO FREQUENCY (RF) IDENTIFICATION (RFID) OBJECT TAGS THROUGH A PORTAL

(71) Applicant: SYMBOL TECHNOLOGIES, LLC, Lincolnshire, IL (US)

(72) Inventors: Mark W. Duron, Mastic, NY (US); Daniella Strat, Sound Beach, NY (US); Timothy B. Austin, Stony Brook, NY (US); David Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/384,475

(22) Filed: Dec. 20, 2016

(65) Prior Publication Data

US 2018/0173912 A1    Jun. 21, 2018

(51) Int. Cl.
*G08B 13/24* (2006.01)
*G06K 7/10* (2006.01)

(52) U.S. Cl.
CPC .............................. *G06K 7/10425* (2013.01)

(58) Field of Classification Search
CPC .................................................. G06K 7/10425
USPC .......................... 340/572.1–572.9, 10.1–10.6
See application file for complete search history.

(56) References Cited

U.S. PATENT DOCUMENTS

| | | | |
|---|---|---|---|
| 7,397,378 B1* | 7/2008 | Leason | G06K 19/0739 340/10.1 |
| 2006/0132312 A1* | 6/2006 | Tavormina | B66F 9/0755 340/572.7 |
| 2010/0219953 A1* | 9/2010 | Bloy | G01S 13/003 340/572.1 |
| 2010/0225482 A1* | 9/2010 | Kasai | G06K 19/0717 340/572.1 |
| 2011/0063113 A1* | 3/2011 | Hook | G01S 5/0205 340/572.1 |
| 2011/0074581 A1* | 3/2011 | Falkenberg | G08B 13/2402 340/568.1 |
| 2012/0101956 A1* | 4/2012 | Hyre | G06Q 10/083 705/330 |
| 2013/0099004 A1* | 4/2013 | Alo | G06K 19/07327 235/492 |
| 2015/0194030 A1* | 7/2015 | Davidson | G08B 13/248 340/572.7 |

(Continued)

*Primary Examiner* — Brian Zimmerman
*Assistant Examiner* — Thang Tran
(74) *Attorney, Agent, or Firm* — Yuri Astvatsaturov

(57) ABSTRACT

A radio frequency (RF) identification (RFID) reader is mounted in a venue in proximity to a portal that is openable and closable by a door. The portal reader reads RFID object tags associated with objects that approach the portal. An electrical conductor is associated, and jointly movable, with the door. A portal RFID tag is mounted at the portal. The portal tag is overlain by the electrical conductor in a closed door position and is remote from the electrical conductor in an open door position. The portal tag is readable by the portal reader in either the open or the closed door position. A controller identifies any objects that have passed through the portal based on whether the object tags have been read, as well as whether the portal tag has been read in either the open or the closed door position.

16 Claims, 7 Drawing Sheets

(56) References Cited

U.S. PATENT DOCUMENTS

2016/0117534 A1\* 4/2016 Roth ................. G06Q 10/0875
　　　　　　　　　　　　　　　　　　　　　340/10.1
2017/0180062 A1\* 6/2017 Johansen ................ H04W 4/70

\* cited by examiner

ARRANGEMENT FOR, AND METHOD OF, DETECTING PASSAGE OF OBJECTS ASSOCIATED WITH RADIO FREQUENCY (RF) IDENTIFICATION (RFID) OBJECT TAGS THROUGH A PORTAL

BACKGROUND OF THE INVENTION

The present disclosure relates generally to an arrangement for, and a method of, detecting passage of objects associated with radio frequency (RF) identification (RFID) object tags through a portal that is openable and closable by a door movable between respective open and closed positions at a venue.

Radio frequency (RF) identification (RFID) technology is becoming increasingly important for logistics concerns, material handling and inventory management in retail stores, warehouses, distribution centers, buildings, and like venues. An RFID system typically includes a plurality of RFID readers, also known as interrogators, deployed about a venue. Each RFID reader interrogates multiple RFID object tags in its coverage range. Each object tag is usually attached to, or associated with, an individual object or item, or to a package for the item, or to a pallet or container for supporting or containing multiple items. Each object tag typically includes a tag antenna for receiving and/or transmitting RF waves, and an integrated circuit chip that typically has a power management section, a radio section, and frequently a logic section containing a control microprocessor, a memory, or both. Each RFID reader transmits an RF interrogating signal, and each object tag, which senses the interrogating RF signal with its tag antenna, responds by transmitting a return RFID receive signal from its tag antenna. The object tag either generates the return RFID receive signal originally, or reflects back a portion of the interrogating RF signal in a process known as backscatter. The return RFID receive signal may be decoded into data by each reader, which thereby identifies, counts, or otherwise interacts with the associated object, and/or can be used for locationing applications, i.e., for estimating and determining the location or bearing, i.e., the angular direction both in azimuth and elevation, of any particular object and its object tag relative to a particular reader or readers by triangulation/trilateration techniques known in the art.

In such venues, it is sometimes necessary to accurately determine which RFID-tagged objects inside the venue have exited the venue, e.g., have passed through a portal, which is openable and closable by a door, to the outside of the venue. An interior RFID reader inside the venue and proximal to the portal is typically able to read object tags that approach the portal. However, the interior RFID reader, by itself, cannot always accurately determine whether any particular RFID-tagged objects have actually passed through the portal. For example, it is possible that a particular RFID-tagged object has been advanced to be near the portal, but has been backed away from the portal without ever passing therethrough. It is also possible that the RFID-tagged objects are just unreadable by the interior RFID reader. As a result, the RFID system may not always accurately know which and how many RFID-tagged objects have actually exited the venue.

For greater accuracy, another RFID reader could be mounted outside the venue to read any RFID-tagged objects that have passed through the portal. However, this involves positioning antennas at, and routing cables to, the exterior of the venue. Holes may have to be drilled through walls of the venue, and any such holes would typically need to be properly sealed. In addition, the antennas and the cables typically need to be weatherized, armored, and protected from vandalism since they are exposed outside the venue. The installation of such an exterior RFID reader can be cost prohibitive, especially for smaller venues.

Accordingly, there is a need to accurately and inexpensively determine which and how many RFID-tagged objects have actually passed through the portal without having to install hardware, such as RFID readers, outside the venue.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
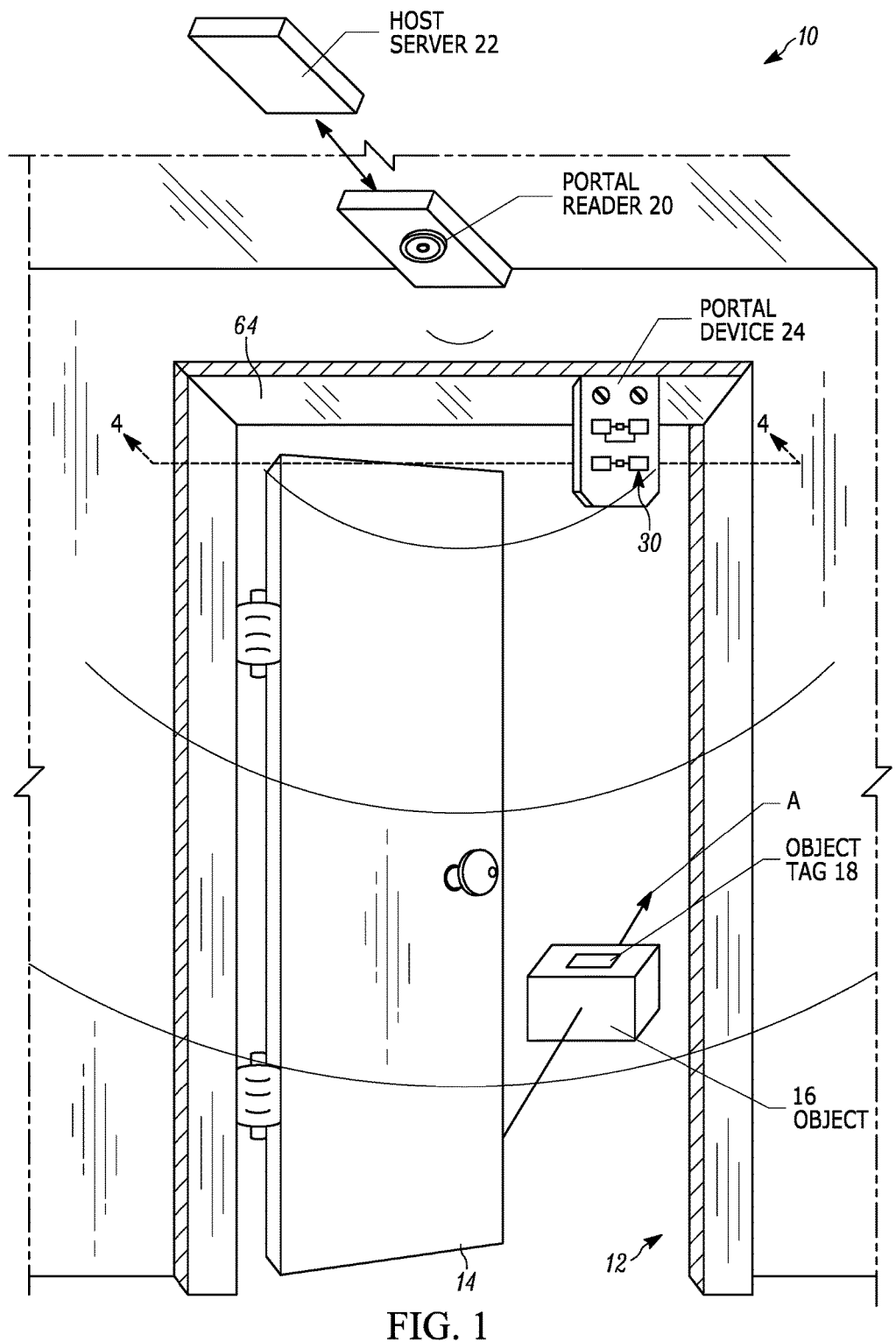
FIG. 1 is a broken-away, perspective view of an arrangement for detecting passage of objects associated with radio frequency (RF) identification (RFID) object tags through a portal that is openable and closable by a door at a venue in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an arrangement for detecting passage of objects associated with radio frequency (RF) identification (RFID) object tags through a portal that is openable and closable by a door movable between respective open and closed positions at a venue, such as a retail store, a warehouse, a building, or any other controlled area in which RFID-tagged objects are to be identified and/or located and/or monitored and/or tracked. The arrangement includes a portal RFID reader mounted in the venue in proximity to the door for reading the RFID object tags that approach the portal. The arrangement also includes an electrical conductor that is associated, and jointly movable, with the door. If the door is constituted of an electrically conductive material, such as metal, then the electrical conductor is advantageously constituted of the electrically conductive metal material of the door itself. If the door is constituted of an electrically non-conductive material, such as wood, then the electrical conductor may, in one embodiment, be configured as an electrically conductive, metal plate or tape that is mounted on the door.

The arrangement further includes a portal device mounted at the portal, for example, on a doorframe of the door. The doorframe may be constituted of either an electrically conductive material or an electrically non-conductive material. The portal device includes a portal RFID tag that is overlain by the electrical conductor in the closed position of the door and that is remote from the electrical conductor in the open position of the door. The portal tag is readable by the portal reader in either the open position or the closed position of the door. A controller is operatively connected to the portal reader. The controller identifies the objects that have passed through the portal based on whether the object tags have been read, as well as whether the portal tag has been read in either the open position or the closed position of the door.

The portal tag includes a dipole antenna having a pair of spaced-apart antenna elements. In a first embodiment, the electrical conductor, e.g., the aforementioned metal door or the aforementioned metal plate or tape, bridges and shunts the antenna elements to prevent the portal tag from being read in the closed position of the door, in which case, the portal tag may be read by the portal reader in the open position of the door. In a second embodiment, the electrical conductor includes an inductive shunt for inductively shunting the antenna elements to enable the portal tag to be read in the closed position of the door, in which case, the portal tag is prevented from being read by the portal reader in the open position of the door. In a third embodiment, the electrical conductor includes a pair of capacitive shunts for capacitively shunting each antenna element to enable the portal tag to be read in the closed position of the door, in which case, the portal tag is prevented from being read by the portal reader in the open position of the door.

Preferably, the portal device includes a support on which the portal tag is mounted, and the support is constituted of a resilient material for resiliently bearing against the door in the closed position. The portal device may include a tamper tag that is readable by the portal reader in each position of the door, in which case, the controller determines that the portal device has been tampered with when the tamper tag is no longer being read. The tamper tag also includes a dipole antenna having a pair of spaced-apart antenna elements, and a tamper wire may be connected between the antenna elements as an impedance transformer. If the tamper wire is disturbed, an impedance mismatch is created, thereby preventing the portal reader from reading the tamper tag, and the controller detects that the portal reader has not read the tamper tag. A tear line may extend along the support across the tamper wire. The tamper tag is preferably optimized for use either against an electrically conductive door or doorframe, or against an electrically non-conductive door or doorframe.

A method, in accordance with another aspect of the present disclosure, of detecting passage of objects associated with radio frequency (RF) identification (RFID) object tags through a portal that is openable and closable by a door movable between respective open and closed positions at a venue, is performed by reading the RFID object tags that approach the portal with a portal RFID reader mounted in the venue in proximity to the door, by associating an electrical conductor with the door for joint movement therewith, and by mounting a portal device having a portal RFID tag at the portal in a location in which the portal tag is overlain by the electrical conductor in the closed position of the door and is remote from the electrical conductor in the open position of the door. The portal tag is readable by the portal reader in either the open position or the closed position of the door. The method is further performed by identifying the objects that have passed through the portal based on whether the object tags have been read, as well as whether the portal tag has been read in either the open position or the closed position of the door.

Turning now to the drawings, reference numeral 10 in FIG. 1 generally identifies a venue having a doorway or portal 12 that is openable and closable by a door 14 shown in an open position in FIG. 1 to permit passage of an object 16 associated with, or attached to, a radio frequency (RF) identification (RFID) object tag 18 in the direction of the arrow A from the interior of the venue 10 to the exterior of the venue 10. The venue 10 may advantageously be a retail store, a warehouse, a building, or any other controlled area in which one or more RFID-tagged objects 16 are to be identified and/or located and/or monitored and/or tracked. Although the door 14 has been depicted in FIG. 1 as a hinged barrier, it may also be a sliding, or a revolving, or a rollup, barrier. Although the object 16 has been depicted in FIG. 1 as a cuboid box, it may have any shape and may be any item or product, or any package for the item or product, or any pallet or container for supporting multiple items or products. The object tag 18 is preferably a passive RFID tag, e.g., not battery-operated, for cost reduction reasons, although other types of RFID tags may also be employed. As used herein, the term portal 12 is intended to mean any area or transition through which each RFID-tagged object 16 passes between the interior and the exterior of the venue 10.

An RFID tag reading system is deployed inside the venue 10 and includes a plurality of RFID object tag readers for reading and tracking the RFID object tag 18 associated with each object 16 in the venue 10. At least one of the readers, hereinafter known as a portal RFID reader 20, is located in proximity to the portal 12. Although the portal reader 20 has been shown in FIG. 1 as being located overhead on the ceiling above the door 14, the portal reader 20 need not be on the ceiling and can be mounted anywhere inside the venue 10 near the portal 12. Although the portal reader 20 has been shown in FIG. 1 as a single physical device, it may also be comprised of a physically separate radio and antenna(s) cabled together. The portal reader 20 is operative for reading the RFID object tag 18 associated with each object 16 that approaches the portal 12.

A host server or controller 22 is operatively connected, either by wired or wireless links, to all the readers and, as shown in FIG. 1, to the portal reader 20. It will be understood that the controller 22 is preferably located in a backroom, well away from the portal reader 20. The portal reader 20 and the controller 22 may be powered from electrical outlets, powered over the Ethernet (POE), or can be battery powered. The controller 22 is a programmed microprocessor that controls the operation of each reader. The controller 22 may comprise one or more computers or a cloud server.

An electrical conductor is associated, and is jointly movable, with the door 14. If the door 14 is constituted of an electrically conductive material, such as metal, then the electrical conductor is advantageously constituted of the electrically conductive metal material of the door 14 itself. If the door 14 is constituted of an electrically non-conductive material, such as wood, then the electrical conductor may, in one embodiment, be configured as an electrically conductive, metal plate or tape that is mounted on the door 14.

Figure 2:
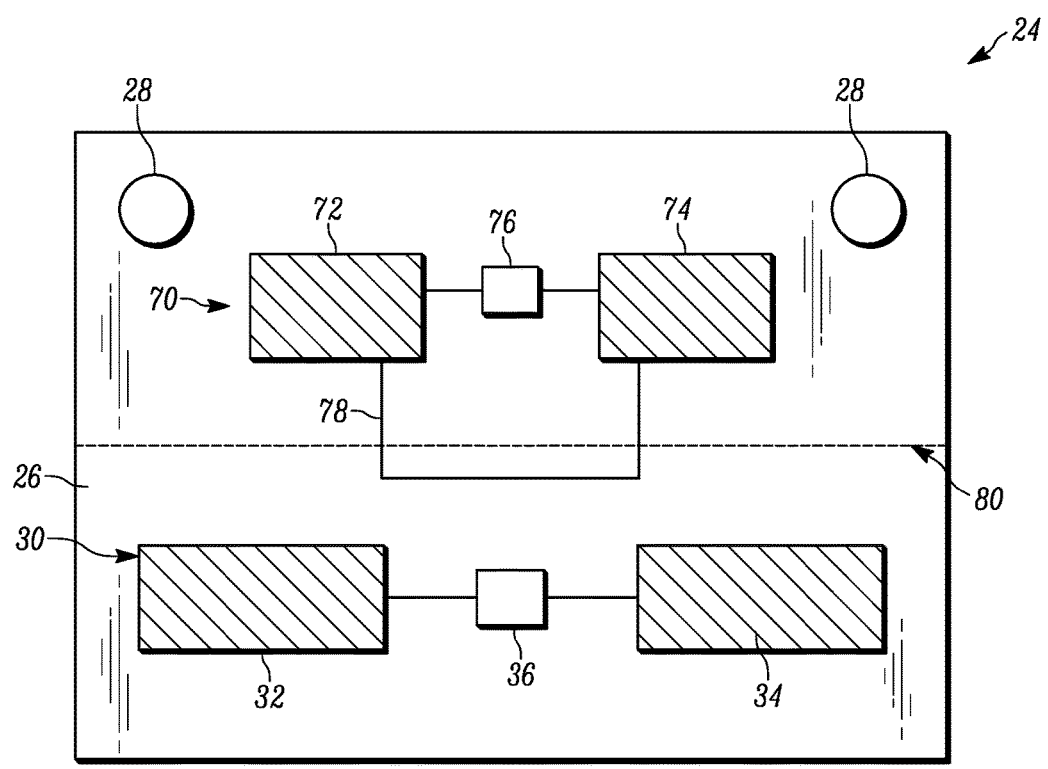
FIG. 2 is an enlarged plan view of one embodiment of a portal device in isolation for use in the arrangement of FIG. 1.

A portal device 24 is mounted at the portal 12, preferably inside the venue 10, for example, on an interior doorframe 64 of the door 14, as shown in FIG. 1. The doorframe 64 may be constituted of either an electrically conductive material, or an electrically non-conductive material. As shown in the enlarged view of FIG. 2, the portal device 24 includes a generally planar substrate or support 26, preferably constituted of a resilient material, such as rubber, having a pair of mounting holes 28 through which a pair of fasteners is inserted to fixedly secure the portal device 24 in position, for example, overhead on a frame of the door 14. Although the portal device 24 has been shown as being mounted with a pair of screw-type fasteners and corresponding mounting holes, the portal device 24 may be mounted in many other ways. For example, the mounting holes 28 may be different in number and in location, and may even be omitted. In addition, the portal device 24 may be mounted with an adhesive, or any other type of fastener. The portal device 24 has a portal RFID tag 30 on the support 26. The portal tag 30 includes a tag antenna configured as a dipole having a pair of spaced-apart antenna elements 32, 34 for receiving and/or transmitting RF waves, and an integrated circuit chip 36 that typically has a power management section, a radio section, and frequently a logic section containing a control microprocessor, a memory, or both. As shown in FIG. 1, the portal tag 30 is positioned in free space below the doorframe 64 of the door 14.

Figure 3:
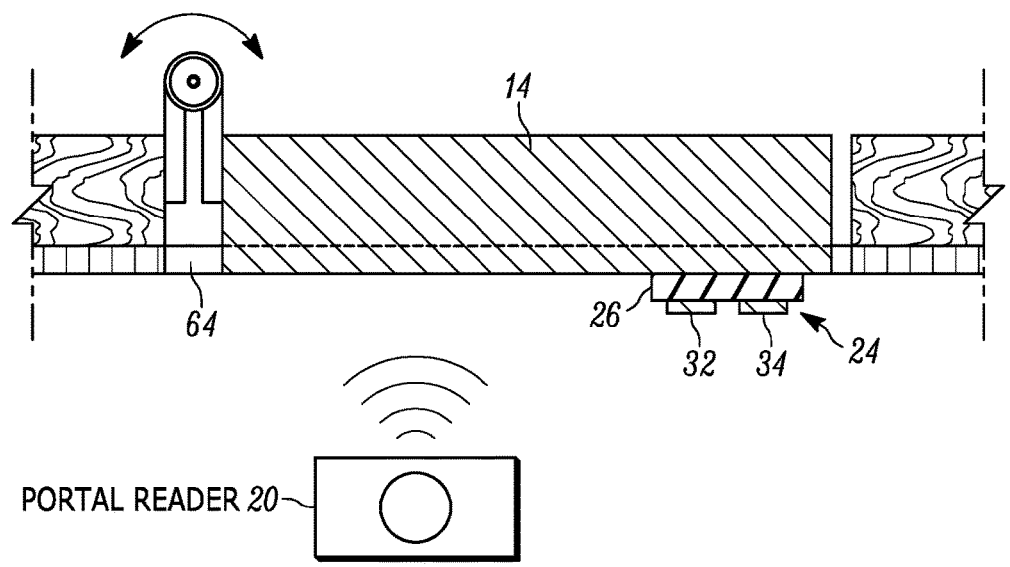
FIG. 3 is an overhead sectional view of the portal device of FIG. 2 with the door in a closed position.
Figure 4:
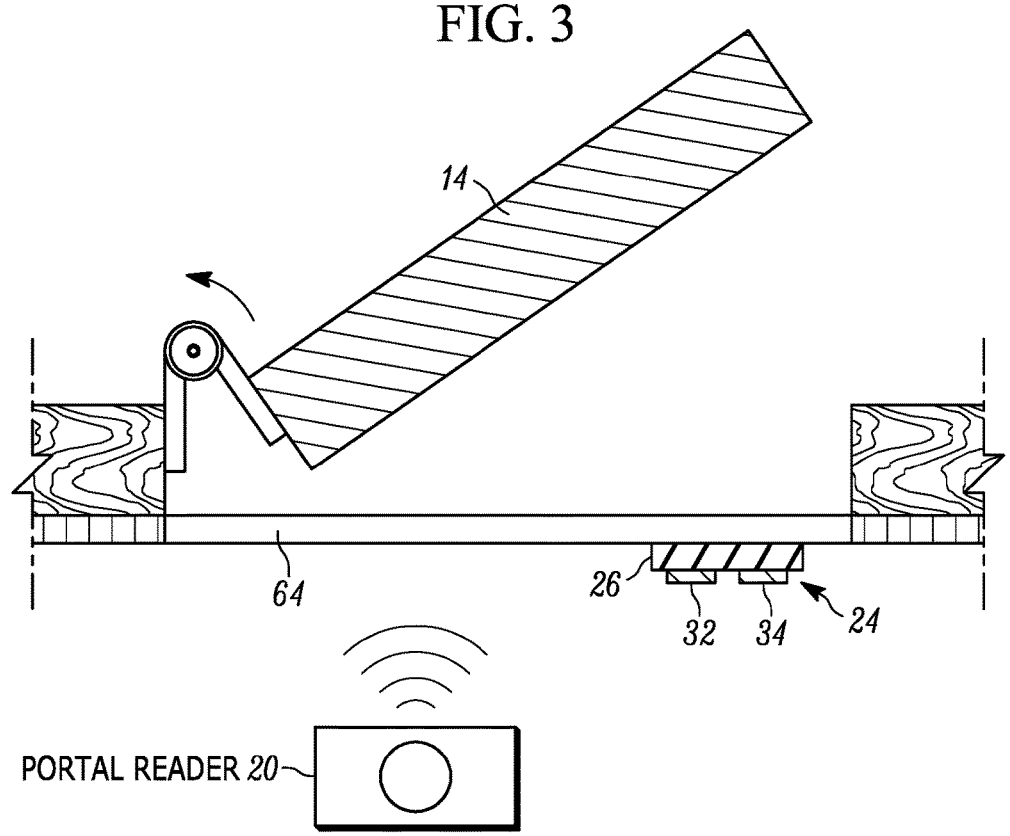
FIG. 4 is a sectional view analogous to FIG. 3 and taken on line 4-4 of FIG. 1, and with the door in an open position.

In the closed position of the door 14, as shown in FIG. 3, the portal tag 30 is overlain by the electrical conductor, e.g., the metal door 14 itself. The metal door 14 bridges, shunts, and short circuits the antenna elements 32, 34, thereby preventing the portal tag 30 from being read by the portal reader 20 in the closed position of the door 14. In the open position of the door 14, as shown in FIG. 4, the portal tag 30 is remote from the metal door 14, and the aforementioned short circuiting condition of the antenna elements 32, 34 in the near electromagnetic field has been removed, thereby enabling the portal tag 30 to be read by the portal reader 20 in the open position of the door 14. Thus, in the embodiment of FIGS. 3-4, the controller 22 is operated to identify the object 16 that passed through the portal 12 based on whether the associated object tag 18 has been read, as well as whether the portal tag 30 has been read in the open position of the door 14. The reading of the portal tag 30 when the door 14 is open increases the confidence that the object 16 has actually passed through the portal 12.

Figure 5:
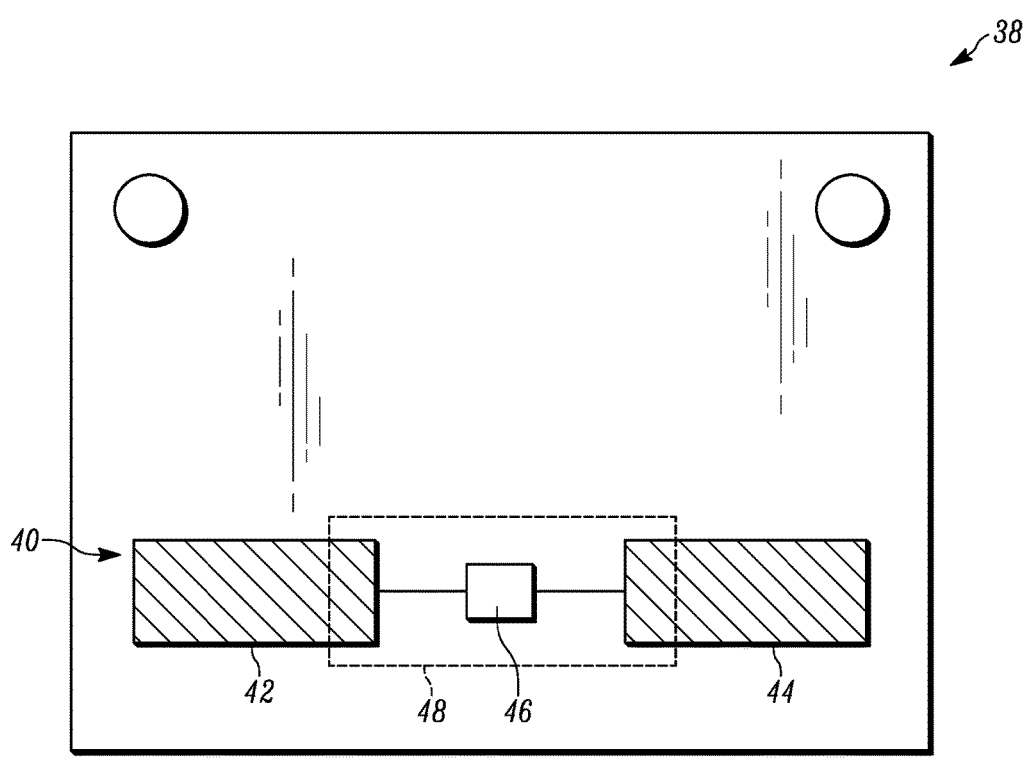
FIG. 5 is an enlarged plan view of another embodiment of a portal device in isolation for use in the arrangement of FIG. 1.
Figure 6:
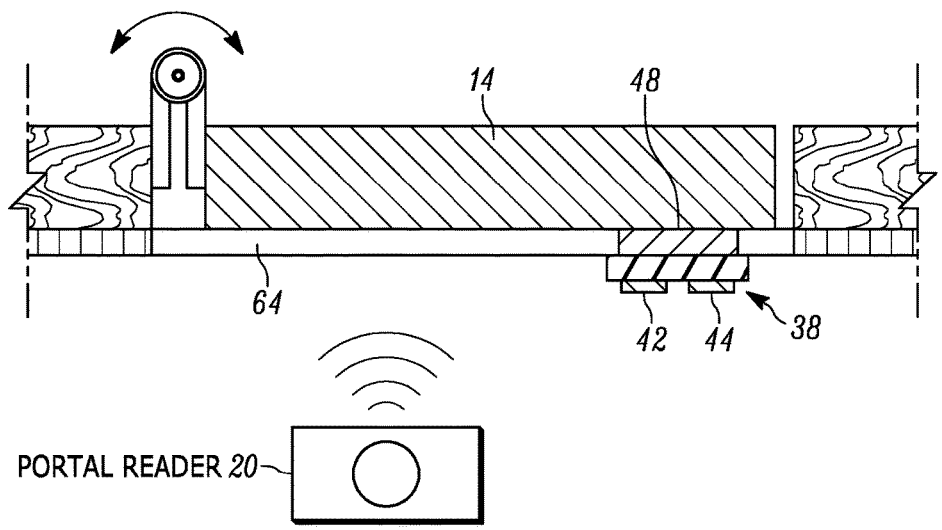
FIG. 6 is an overhead sectional view of the portal device of FIG. 5 with the door in a closed position.
Figure 7:
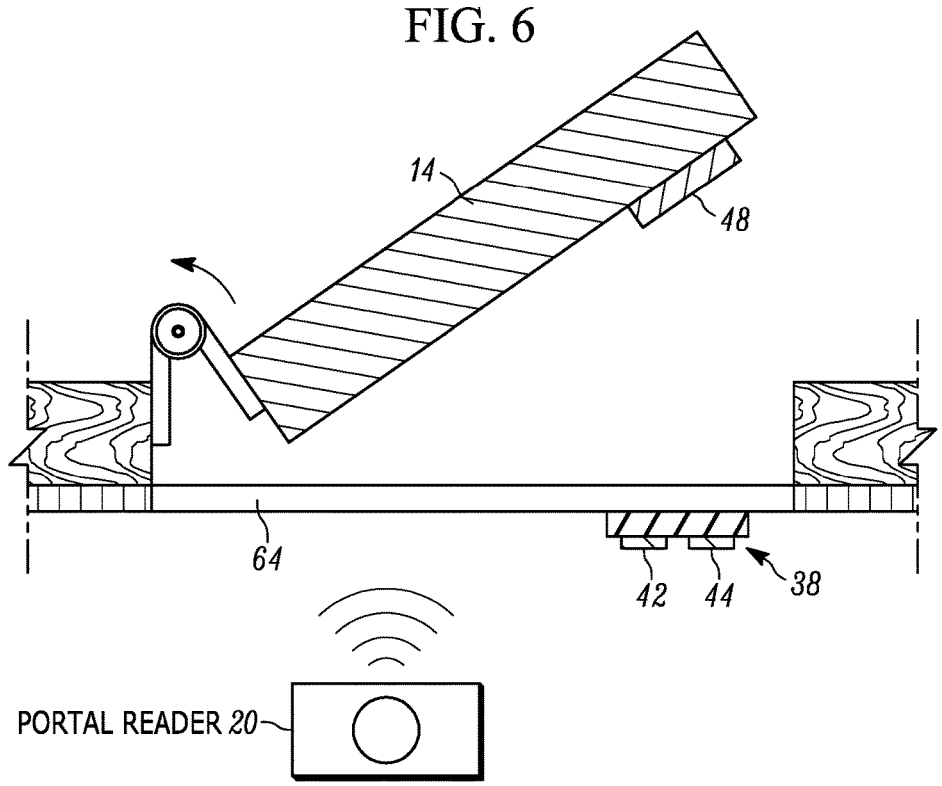
FIG. 7 is a sectional view analogous to FIG. 6, and with the door in an open position.

Another embodiment of a portal device 38 is depicted in FIGS. 5-7. The portal device 38 has a portal RFID tag 40 on a support. The portal tag 40 includes a tag antenna configured as a dipole having a pair of spaced-apart antenna elements 42, 44 for receiving and/or transmitting RF waves, and an integrated circuit chip 46 analogous to chip 36. An electrical conductor configured as an inductive shunt 48 is mounted on the door 14 for joint movement therewith.

In the closed position of the door 14, as shown in FIG. 6, the portal tag 40 is overlain by the inductive shunt 48 in the dashed area depicted in FIG. 5. The inductive shunt 48 bridges and shunts the antenna elements 42, 44, thereby enabling the portal tag 40 to be read by the portal reader 20 in the closed position of the door 14. In the open position of the door 14, as shown in FIG. 7, the portal tag 40 is remote from the inductive shunt 48, and the aforementioned inductive shunt condition of the antenna elements 42, 44 in the near electromagnetic field has been removed, thereby preventing the portal tag 40 from being read by the portal reader 20 in the open position of the door 14. Thus, in the embodiment of FIGS. 5-7, the controller 22 is operated to identify the object 16 that passed through the portal 12 based on whether the associated object tag 18 has been read, as well as whether the portal tag 40 has been read in the closed position of the door 14, or conversely, whether the portal tag 40 has not been read in the open position of the door 14. The reading of the portal tag 40 when the door 14 is closed, and the non-reading of the portal tag 40 when the door 14 is open, increases the confidence that the object 16 has actually passed through the portal 12.

Figure 8:
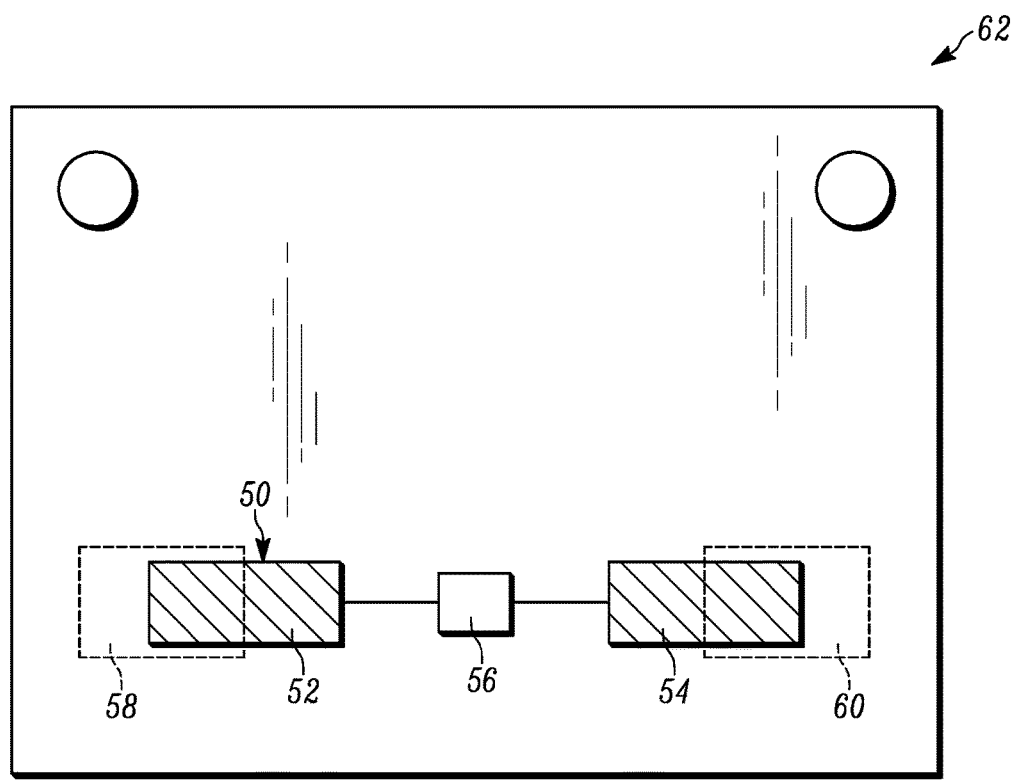
FIG. 8 is an enlarged plan view of still another embodiment of a portal device in isolation for use in the arrangement of FIG. 1.
Figure 9:
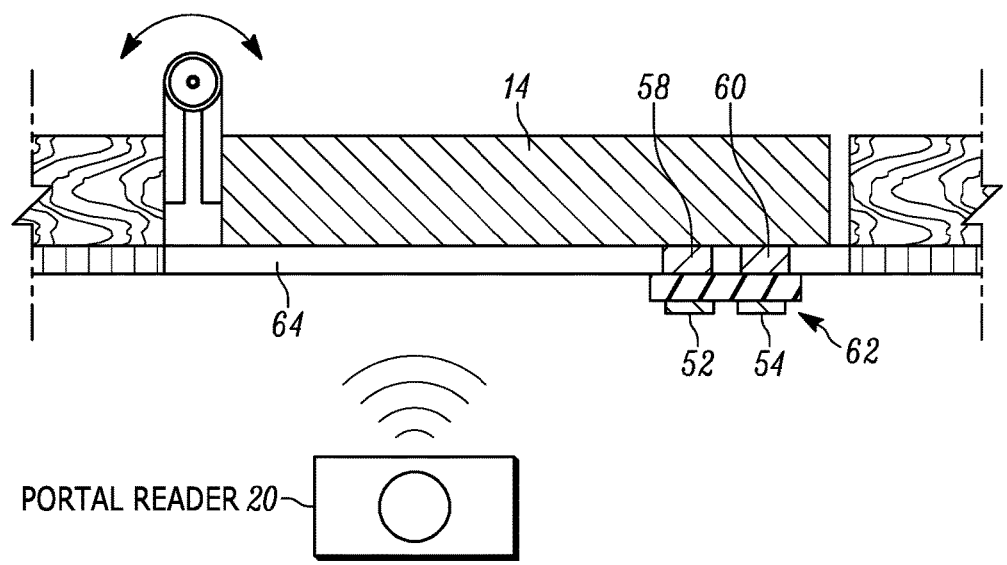
FIG. 9 is an overhead sectional view of the portal device of FIG. 8 with the door in a closed position.
Figure 10:
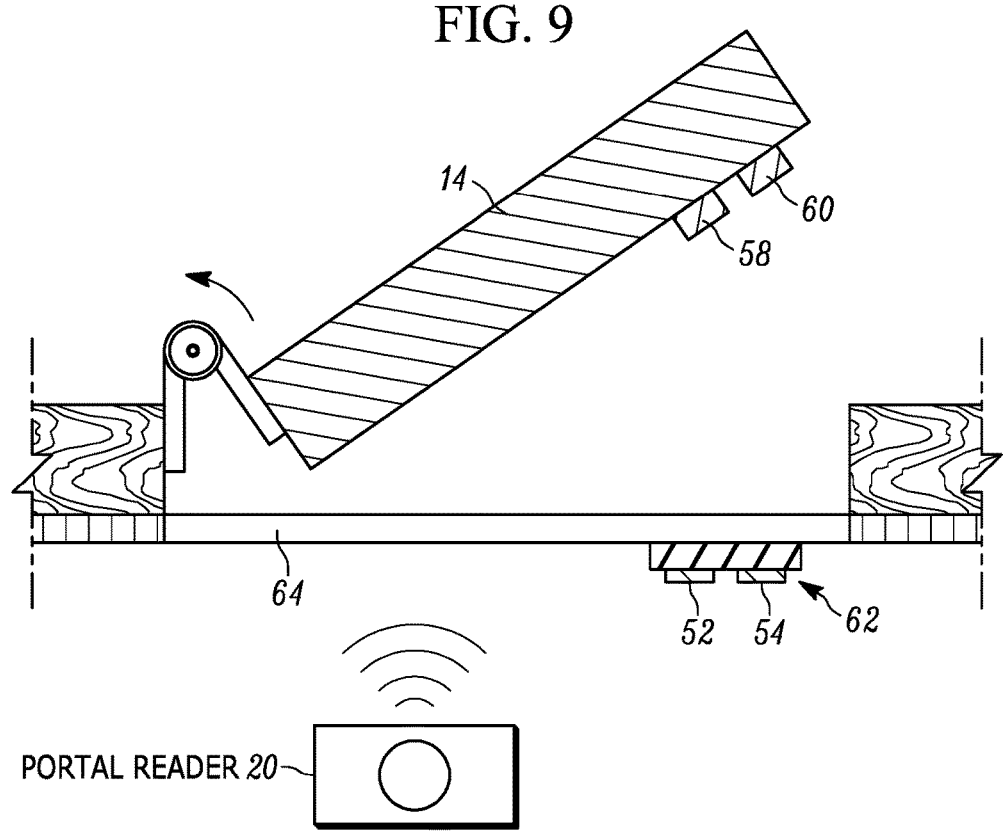
FIG. 10 is a sectional view analogous to FIG. 9, and with the door in an open position.

Still another embodiment of a portal device 62 is depicted in FIGS. 8-10. The portal device 62 has a portal RFID tag 50 on a support. The portal tag 50 includes a tag antenna configured as a dipole having a pair of spaced-apart antenna elements 52, 54 for receiving and/or transmitting RF waves, and an integrated circuit chip 56 analogous to chip 36. An electrical conductor configured as a pair of capacitive shunts 58, 60 is mounted on the door 14 for joint movement therewith.

In the closed position of the door 14, as shown in FIG. 9, the portal tag 50 is overlain by the capacitive shunts 58, 60 in the dashed areas depicted in FIG. 8. The capacitive shunts 58, 60 shunt each of the antenna elements 52, 54, thereby enabling the portal tag 50 to be read by the portal reader 20 in the closed position of the door 14. In the open position of the door 14, as shown in FIG. 10, the portal tag 50 is remote from the capacitive shunts 58, 60, and the aforementioned capacitive shunt condition of the antenna elements 52, 54 in the near electromagnetic field has been removed, thereby preventing the portal tag 50 from being read by the portal reader 20 in the open position of the door 14. Thus, in the embodiment of FIGS. 8-10, the controller 22 is operated to identify the object 16 that passed through the portal 12 based on whether the associated object tag 18 has been read, as well as whether the portal tag 50 has been read in the closed position of the door 14, or conversely, whether the portal tag 50 has not been read in the open position of the door 14. The reading of the portal tag 50 when the door 14 is closed, and the non-reading of the portal tag 50 when the door 14 is open, increases the confidence that the object 16 has actually passed through the portal 12.

Preferably, each portal device 24, 38, 62 includes a support on which the respective portal tag is mounted, and the support is constituted of a resilient material, such as rubber, for resiliently bearing against the door 14 in the closed position. The rubber material ensures that the respective portal device 24, 38, 62 will not be damaged if struck, and also compensates for any gaps that might occur between the door 14 and each portal device 24, 38, 62, and also ensures a good sealing contact between the door 14 and each portal device 24, 38, 62.

Returning to FIG. 2, the portal device 24 may include a tamper tag 70 that is always readable by the portal reader 20 in each position of the door 14, in which case, the controller 22 determines that the portal device 24 has been tampered with when the tamper tag 70 is no longer being read. Tampering could result, for example, by the removal or the masking of the portal device 24. The tamper tag 70 also includes a dipole antenna having a pair of spaced-apart antenna elements 72, 74 and an integrated circuit chip 76 analogous to chip 36. A tamper wire 78 is connected between the antenna elements 72, 74 as an impedance transformer. If the tamper wire 78 is disturbed, an impedance mismatch is created, thereby preventing the portal reader 20 from reading the tamper tag 70, and the controller 22 detects that the portal reader 20 has not read the tamper tag 70. A tear line 80 may extend on the support 26 of the portal device 24 across the tamper wire 78. If a portion of the portal device 24 is ripped or torn off along the tear line 80, then the tamper wire 78 will be interrupted, the impedance mismatch will result, and the tamper tag 70 will no longer be readable. The tamper tag 70 is preferably optimized for use either against an electrically conductive door 14 or doorframe 64, or against an electrically non-conductive door 14 or doorframe 64.

In accordance with this disclosure, there is no hardware presence outside of, or exterior to, the venue 10, and each object 16 that has passed through the portal 12 is reliably identified based on whether the respective object tag 18 has been read, as well as whether the portal tag has been read by the portal reader 20 in either the open position or the closed position of the door 14.

In the foregoing specification, specific embodiments have been described. However, one of ordinary skill in the art appreciates that various modifications and changes can be made without departing from the scope of the invention as set forth in the claims below. For example, in each embodiment, each portal tag 30, 40, 50 was depicted as being situated on the surface of their respective supports that faced the interior of the venue 10. Each such portal tag 30, 40, 50 could also be situated on the opposite surface of the respective support, i.e., the surface facing the exterior of the venue 10. In addition, the term door is intended to be interpreted in a broad sense and may include, for example, a window. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for detecting passage of objects associated with radio frequency (RF) identification (RFID)

object tags through a portal that is openable and closable by a door movable between respective open and closed positions at a venue, the arrangement comprising: a portal RFID reader mounted in the venue in proximity to the door for reading the RFID object tags that approach the portal; an electrical conductor associated, and jointly movable, with the door; a portal device mounted at the portal and having a portal RFID tag, the portal tag being overlain by the electrical conductor in the closed position of the door and being remote from the electrical conductor in the open position of the door, the portal tag being readable by the portal reader in one of the open and closed positions of the door; and a controller operatively connected to the portal reader, and operative for identifying the objects that have passed through the portal based on whether the object tags have been read, as well as whether the portal tag has been read in one of the open and closed positions of the door wherein the portal tag includes a dipole antenna having a pair of spaced-apart antenna elements, wherein the electrical conductor includes at least one of (i) an inductive shunt for inductively shunting the antenna elements to enable the portal tag to be read in the closed position of the door, and wherein the portal tag is prevented from being read by the portal reader in the open position of the door and (ii) a pair of capacitive shunts for capacitively shunting each antenna element to enable the portal tag to be read in the closed position of the door, and wherein the portal tag is prevented from being read by the portal reader in the open position of the door.

2. The arrangement of claim 1, wherein the door is constituted of an electrically conductive material, and wherein the electrical conductor is constituted of the electrically conductive material of the door.

3. The arrangement of claim 1, wherein the electrical conductor is an electrically conductive plate mounted on the door.

4. The arrangement of claim 1, wherein the portal tag is read by the portal reader in the open position of the door.

5. The arrangement of claim 1, wherein the portal device includes a support on which the portal tag is mounted, and wherein the support is constituted of a resilient material for resiliently bearing against the door in the closed position.

6. The arrangement of claim 1, wherein the portal device includes a tamper tag that is readable by the portal reader in each position of the door, and wherein the controller determines that the portal device has been tampered with when the tamper tag is no longer being read.

7. The arrangement of claim 6, wherein the tamper tag includes a dipole antenna having a pair of spaced-apart antenna elements, and a tamper wire connected between the antenna elements as an impedance transformer, and wherein the controller detects that the portal reader has not read the tamper tag due to an impedance mismatch upon disturbance of the tamper wire.

8. The arrangement of claim 7, wherein the portal device includes a support on which the tamper tag is mounted, and wherein the support includes a tear line extending across the tamper wire.

9. A method of detecting passage of objects associated with radio frequency (RF) identification (RFID) object tags through a portal that is openable and closable by a door movable between respective open and closed positions at a venue, the method comprising: reading the RFID object tags that approach the portal with a portal RFID reader mounted in the venue in proximity to the door; associating an electrical conductor with the door for joint movement therewith; mounting a portal device having a portal RFID tag at the portal in a location in which the portal tag is overlain by the electrical conductor in the closed position of the door and is remote from the electrical conductor in the open position of the door, the portal tag being readable by the portal reader in one of the open and closed positions of the door; and identifying the objects that have passed through the portal based on whether the object tags have been read, as well as whether the portal tag has been read in one of the open and closed positions of the door and configuring the portal tag with a dipole antenna having a pair of spaced-apart antenna elements, and at least one of (i) inductively shunting the antenna elements with an inductive shunt to enable the portal tag to be read in the closed position of the door, and preventing the portal tag from being read by the portal reader in the open position of the door and (ii) capacitively shunting each antenna element with a pair of capacitive shunts to enable the portal tag to be read in the closed position of the door, and preventing the portal tag from being read by the portal reader in the open position of the door.

10. The method of claim 9, and constituting the door of an electrically conductive material, and constituting the electrical conductor of the electrically conductive material of the door.

11. The method of claim 9, and configuring the electrical conductor as an electrically conductive plate, and mounting the plate on the door.

12. The method of claim 9, and enabling the portal tag to be read by the portal reader in the open position of the door.

13. The method of claim 9, and configuring the portal device with a support on which the portal tag is mounted, and constituting the support of a resilient material for resiliently bearing against the door in the closed position.

14. The method of claim 9, and configuring the portal device with a tamper tag that is readable by the portal reader in each position of the door, and determining that the portal device has been tampered with when the tamper tag is no longer being read.

15. The method of claim 14, and configuring the tamper tag with a dipole antenna having a pair of spaced-apart antenna elements, and connecting a tamper wire between the antenna elements as an impedance transformer, and wherein the determining is performed by detecting an impedance mismatch upon disturbance of the tamper wire.

16. The method of claim 15, and configuring the portal device with a support on which the tamper tag is mounted, and extending a tear line across the tamper wire.

* * * * *